United States Patent [19]
Matsuo et al.

[11] Patent Number: 4,970,996
[45] Date of Patent: Nov. 20, 1990

[54] TWO STROKE DIESEL ENGINE

[75] Inventors: Noritaka Matsuo; Tatsuyuki Masuda; Masao Koriyama, all of Iwata, Japan

[73] Assignee: Yamaha Hatsudoki Kabushiki Kaisha, Iwata, Japan

[21] Appl. No.: 456,353

[22] Filed: Dec. 26, 1989

[30] Foreign Application Priority Data

Dec. 26, 1988 [JP] Japan .................. 63-326012

[51] Int. Cl.$^5$ .............................................. F02B 33/04
[52] U.S. Cl. .................. 123/73 V; 123/196 R; 137/855
[58] Field of Search ................. 123/1 A, 73 A, 73 V, 123/73 C, 73 B, 196 R, 73 AD; 137/855

[56] References Cited

U.S. PATENT DOCUMENTS

| | | | |
|---|---|---|---|
| 4,423,706 | 1/1984 | Onodera ........................ | 123/52 M |
| 4,599,978 | 7/1986 | Kamata et al. .................. | 123/73 A |
| 4,694,786 | 9/1987 | Bilek et al. .................... | 123/73 AD |
| 4,774,918 | 10/1988 | Kurio et al. ..................... | 123/196 R |
| 4,821,688 | 4/1989 | Slattery ......................... | 184/6.5 |

*Primary Examiner*—David A. Okonsky
*Attorney, Agent, or Firm*—Ernest A. Beutler

[57] ABSTRACT

A two cycle crankcase compression diesel engine having reed type checks valves for controlling the flow of air into a crankcase chamber though an intake passage. The engine is provided with a separate lubricating system in which no lubricant for lubrication is delivered to the intake passage upstream of the check valve. The closing noise of the check valve is dampened by delivery small quantities of lubricant to the intake passage solely for this purpose. In one embodiment, this lubricant is derived from the crankcase and in another embodiment the lubricant is supplied directly from the separate lubricating system.

15 Claims, 3 Drawing Sheets

TWO STROKE DIESEL ENGINE

BACKGROUND OF THE INVENTION

This invention relates to a two stroke diesel engine and more particularly to an improved arrangement for lubricating such an engine and avoiding induction system noise.

It is well known in two cycle crankcase compression engines and particularly those of the diesel type to supply the intake charge to the crankcase chambers through an induction passage that incorporates a check valve, normally of the reed valve type. The reason for the check valve is to insure that none of the intake charge is forced back out of the crankcase chamber during certain portions of the piston stroke. The reed type check valve is particularly advantageous for use in conjunction with such applications.

It is also known that there is a necessity for supplying lubricant to the engine and frequently this is done by mixing oil with the fuel in intake charge so as to lubricate the engine parts such as the connecting rod bearing and crank shaft journals. However, in such an arrangement the burned oil becomes the cause of blue smoke particularly at low loads which is objectionable. It has been proposed, therefore, to apply a separate lubricating system that will deliver lubricant directly to the components of the engine without introducing it through the intake charge. When this occurs and the engine has direct fuel injection, as is common with a diesel engine, however, the reed type check valve operates only on induction system air and the opening and closing of the valve plates can give rise to a slapping noise which may be objectionable under running conditions.

It is, therefore, a principal object of this invention to provide an improved lubricating and valving system for a two cycle diesel engine.

It is a further object of this invention to provide an improved arrangement for lubricating a two cycle internal combustion engine and, at the same time, avoiding the noise of the reed type valve in the induction system.

It is a further object to this invention to provide an arrangement for providing sufficient lubricant to a reed type valve to avoid noise during its closing operation but without causing the effect of blue smoke in the exhaust of the engine.

SUMMARY OF THE INVENTION

This invention is adapted to be embodied in a two cycle crankcase compression internal combustion engine having an intake passage for delivery a charge to the engine. A reed type check valve has a resilient leaf type valving element and a relatively rigid valve seat that defines a flow opening that is controlled by the leaf type valving element and is positioned in the intake passage. In accordance with the invention, means are provided for delivery sufficient lubricant to the induction passage upstream of the reed type valve in sufficient quantities only to dampen the closing sound of the valving element as it engages the valve seat.

DETAILED DESCRIPTION OF THE PREFERRED EMBODIMENTS

Figure 1:
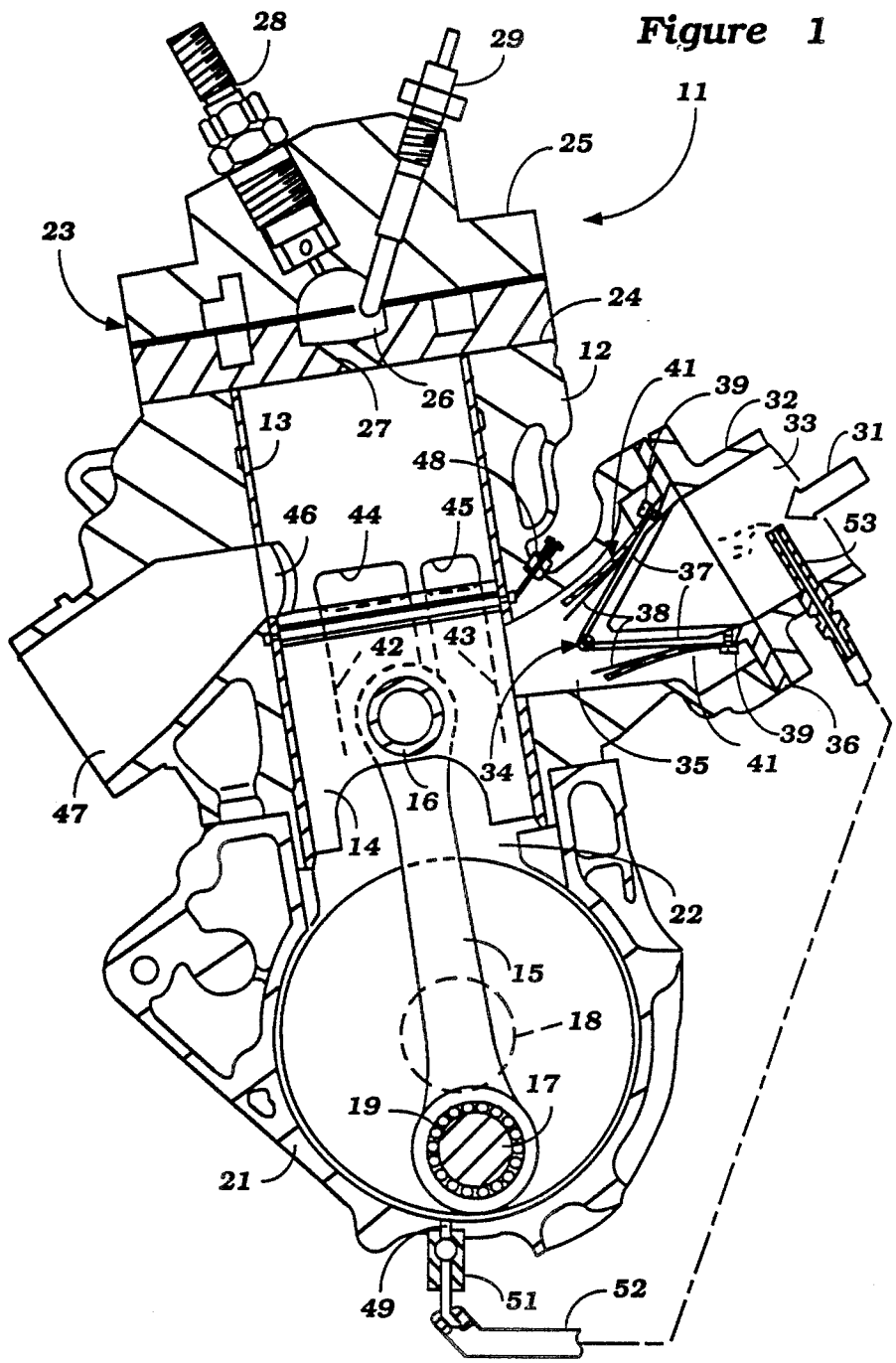
FIG. 1 is a cross sectional view taken through a two cycle crankcase compression diesel engine constructed in accordance with an embodiment of the invention.
Figure 2:
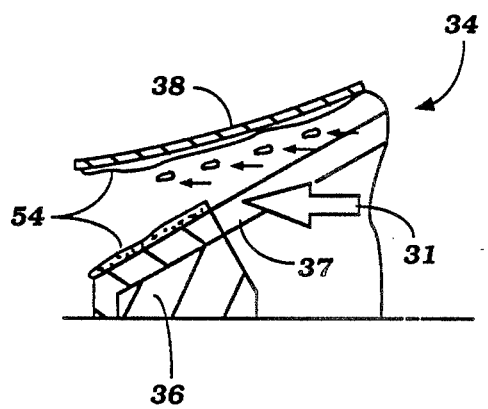
FIG. 2 is an enlarged cross sectional view take through the reed type valve showing it in its open condition.
Figure 3:
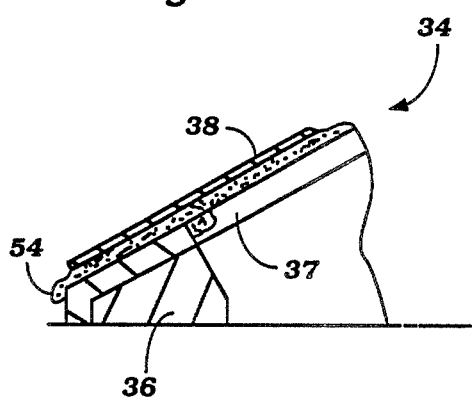
FIG. 3 is a cross sectional view, in part similar to FIG. 2, showing the valve in its closed position.

Referring now in detail to the drawings and first to the embodiment of FIGS. 1 through 3, a two cycle crankcase compression diesel engine is identified generally by the reference numeral 11. The engine 11 is depicted in cross section through only a single one of its cylinder. It should be readily apparent to those skilled in the art how the invention can be practiced in conjunction with multiple cylinder engines having any type of cylinder configuration.

The engine 11 is comprised of a cylinder block 12 having one or more cylinder bores in which pressed in cylinder liners 13 are provided. A piston 14 is suppoeted for reciprocation in each cylinder liner and is connected to the upper end of a connecting rod 15 by means of a piston pin 16. The lower end of the connecting rod 15 is connected to a throw 17 of a crank shaft 18 by means of a suitable bearing assembly, a roller bearing type assemble 19 is utilize in the depicted embodiment. The crank shaft 18 is supported for rotation relative to the cylinder blocks 12 and to a crankcase that is affixed to the cylinder block in a known manner.

A crankcase chamber 22 is formed below the piston 14. As is conventional in this type of engine, the individual crankcase chambers 22 associated with each of the cylinder bores 13 are sealed from each other in an appropriate manner.

A cylinder head assembly, indicated that generally by the reference 23 and comprised of a lower spacer plate 24 and a main portion 25 are affixed to the cylinder block 12 in a appropriate manner. The spacer plate 24 and main portion 25 form a pre-chamber 26 that communicates with the main chamber formed above the head of the piston 14 through a throat section 27.

A fuel charge is admitted to the pre-chamber 26 by an injection nozzle 28 that is affixed to the cylinder head assembly 23 in a known manner. A glow plug assembly 29 is also affixed to the head assembly 23 and extends into the pre-chamber 26 for at least starting operation.

An air charge indicated by the arrow 31 is delivered to the crankcase chambers 22 by means including an intake manifold 32 having individual intake passage 33 each serving a respective one of the chambers 22. A reed type check valve assembly, indicated generally by the reference numeral 34 is clamped between the intake manifold 32 and an intake passage 35 formed in the cylinder block 12 and which communicates at its downstream and with th crankcase chamber 22 when the piston is above its bottom dead center by a more than a predetermined amount.

The reed type check valve 34 is comprised of a mounting plate 36 having a pair of angularly disposed flow openings 37 formed therein. Leaf type valve elements 38 are affixed to the mounting plate 36 by means of screws 39 along with stopper plates 41. The stopper plates 41 act to limit the maximum degree of opening of the valve elements 38.

When the pressure in the intake passage 35 is above atmospheric, the valve elements 38 will move to a close position closing the openings 37 in the mounting member. It should be noticed that the openings 37 are angularly disposed so that the value assembly 34 has a generally V-shaped configuration in cross section.

The air charge which has been admitted to the crankcase chambers 22 is compressed therein and is then transferred by a plurality of scavenge of transfer passages 42 and 43 to the area above the piston 14 through respective scavenger ports 44 and 45 respectively. At the appropriate position, fuel is injected into the prechamber 26 from the nozzle 28 and will burn and then issue in to the main combustion chamber for expansion. The burnt charge is then discharged to the atmosphere through one or more exhaust ports 46 formed in the cylinder liner 13 and which communicate with exhaust passages 47 formed in the cylinder block 12.

The engine 11 is provided with a direct lubrication system by which lubricant is delivered to certain of the components to be lubricated directly. This lubrication system may be of any known type and includes, for example, a delivery nozzle 48 that sprays against the piston 14 and piston rings. Also, delivery arrangements may be provided for lubricating the bearings 19 of the connecting rods 15 and the main bearings (not shown) of the crank shaft 18. This lubricant is supplied by a external pump and, as noted, the lubricating system may be of any known type. However, in accordance with this embodiment of the invention, no lubricant is supplied by this external system directly to the intake passage 33 of the manifold 32.

Because of the fact that there would be no lubricant supplied to the intake passages, the closing of the valve elements 38 will be accompanied by certain noise when the valve elements 38 strike the mounting 39 around the openings 37. To avoid this noise, there is provided a drain passageway 49 that extends from a lower point in the crankcase chamber 22 where excess or condensed lubricant may collect. A ball type check valve 51 communicates the drain passageway 49 with a conduit 52 which, in turn, extends to a spray nozzle 53 positioned centrally in the manifold passageway 33 approximately at the apex of the caging member 36. As a result, small amounts of lubricant will be drawn from the crankcase chamber 22 through the check valve 51 and conduit 52 for discharge as shown in FIGS. 1 and 2. This lubricant will accumulate on the valve elements 38 and on the caging member 36 as shown at 54. As a result, when the valve elements 38 move to their closed position, this accumulated lubricant will provide a damping or silencing effect and thus avoid the noise which would otherwise occur. However, since the main supply of lubricant is not supplied to the intake passageways 33 there will be no likelihood of blue smoke in the exhaust of the engine under any running conditions.

It has been found that the optimum location of the spray nozzle 53 upstream of the entry to the check valve assembly 34 is in the range 5 to 10 milimeters. If the distance is greater than that, the lubricate may adhere to the walls of the intake passageway 33 and if it is less than that, the lubricate may not be vaporized sufficiently so as to provide the desired result.

Figure 4:
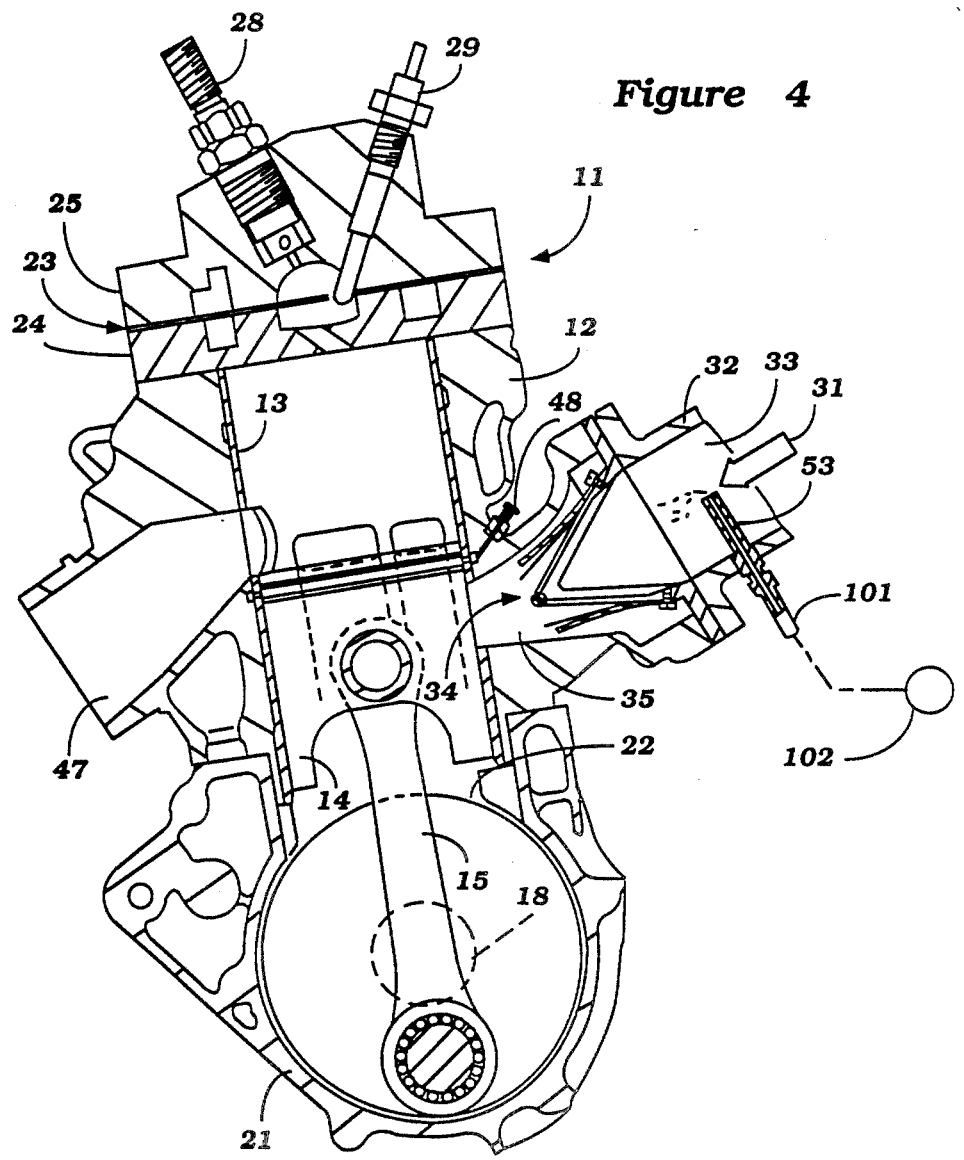
FIG. 4 is a cross sectional view, in part similar to FIG. 1, showing and engine constructed in accordance with another embodiment of the invention.

In the embodiment as thus far described, the lubricant supplied to the intake passage 33 for dampening the noise of the reed type check valve 34 was obtained from lubricant accumulating in the crankcase chamber 22. FIG. 4 show another embodiment of the invention wherein the main components of the engine are the same as the previously described embodiment and, for that reason, have been identified by the same reference numerals. In this embodiment, however, the nozzle 53 is connected by means of a conduit 101 to a small metering port of a lubricant pump 102 which supplies lubricant to the other components of the engine as aforedescribed. The port which supplies the conduit 101 and nozzle 53 is, however, quite small since the main lubricant supply for the engine is not supplied in this area, Only sufficient lubricant is supplied so as to dampen the valve noise as afornoted and, for that reason, blue smoke will not be present with this embodiment as with the previously described embodiment.

It should be readily apparent from the foregoing descriptions that the embodiments of the inventions illustrated and described are particularly adapted to insure that the reed type check valve of the engine of the engine induction system will not emanate any significant noise due to its operation and, at the same time, the engine exhaust will not experience any blue smoke due to the containment of large amounts of lubricant in it.

The foregoing is, as has been noted, is a description of only preferred embodiments of the invention and various changes and modification may be made without departing from the spirit and scope of the invention, as defined by the appended claims.

We claim:

1. In a two stroke crankcase compression internal combustion engine comprising an intakes passage for delivering a charge to said engine, a reed type check valve in said intake passage for preventing reverse flow therethrough, said reed type check valve having a resilient leaf type valving element and a relatively rigid valve seat defining a flow opening controlled by said leaf type valving element, the improvement comprising means for delivery lubricant to said indunction passage upstream of said reed type check valve only in sufficient quantities to dampening the closing sound of said leaf type valving element as it engages said valve seat.

2. In a two stroke crankcase compression internal combustion engine as set forth in claim 1 wherein the valve seat defines a pair of angularly related flow openings each controlled by a respective leaf type valving element.

3. In a two stroke crankcase compression internal combustion engine as set forth in claim 2 wherein the lubricant is delivered to the center of the intake passage.

4. In a two stroke crankcase compression internal combustion engine as set forth in claim 3 wherein the lubricant is delivered at a point in the range of 5 to 10 millimeters upstream of the intake to the reed type check valve.

5. In a two stroke crankcase compression internal combustion engine as set forth in claim 4 wherein the lubricant is obtained from drains accumulating in the crankcase.

6. In a two stroke crankcase compression internal combustion engine as set forth in claim 5 further including separate lubricating means for delivery lubricant from a lubricant source directly to the components of the engine to be lubricated and not through the intake passage.

7. In a two stroke crankcase compression internal combustion engine as set forth in claim 6 wherein the engine is of the direct injection type.

8. In a two stroke crankcase compression internal combustion engine as set forth in claim 7 wherein the engine operates on the diesel cycle and the fuel is directly injected into a pre-chamber that communicates directly with the main chamber.

9. In a two stroke crankcase compression interenal combustion engine as set forth in claim 1 wherein the lubricant is delivered to the center of the intake passage.

10. In a two stroke crankcase compression internal combustion engine as set forth in clain 9 wherein the lubricant is delivered at a point in the range of 5 to 10 millimeters upstream of the intake to the reed type check valve.

11. In a two stroke crankcase compression internal combustion engine as set forth in claim 1 wherein the lubricant is delivered to the intake passage from the crankcase of the engine.

12. In a two stroke crankcase compression internal combustion engine as set forth in claim 11 further including separate lubricating means for delivery lubricant from a lubricant source directly to the components of the engine to be lubricated and not through the intake passage.

13. In a two stroke crankcase compression internal combustion engine as set forth in claim 12 wherein the engine is of the direct injection type.

14. In a two stroke crankcase compression internal combustion engine as set forth in claim 8 wherein the engine operates on the diesel cycle and the fuel is directly injected into a pre-chamber that communicates directly with the main chamber.

15. In a two stroke crankcase compression internal combustion engine as set forth in claim 14 wherein the lubricant is delivered at a point in the range of 5 to 10 millimeters upstream of the intake to the reed type check valve.

* * * * *